(12) United States Patent
Ryan (10) Patent No.: US 10,178,822 B2
(45) Date of Patent: Jan. 15, 2019

(54) SEEDING TOOL

(71) Applicant: Ausplow Pty. Ltd., Jandakot (AU)

(72) Inventor: John William Ryan, Jandakot (AU)

(73) Assignee: AUSPLOW PTY. LTD., Jandakot (AU)

( * ) Notice: Subject to any disclaimer, the term of this patent is extended or adjusted under 35 U.S.C. 154(b) by 0 days.

(21) Appl. No.: 15/406,239

(22) Filed: Jan. 13, 2017

(65) Prior Publication Data

US 2017/0257999 A1     Sep. 14, 2017

(30) Foreign Application Priority Data

Mar. 8, 2016   (AU) ................................ 2016900858

(51) Int. Cl.
*A01C 5/06* (2006.01)
*A01C 7/06* (2006.01)
*A01C 7/20* (2006.01)
*A01B 49/06* (2006.01)

(52) U.S. Cl.
CPC .............. *A01B 49/06* (2013.01); *A01C 5/062* (2013.01); *A01C 5/068* (2013.01); *A01C 7/06* (2013.01); *A01C 7/206* (2013.01)

(58) Field of Classification Search
CPC .. A01C 5/062; A01C 5/06; A01C 5/00; A01C 5/068; A01C 5/066; A01C 7/06; A01C 7/00; A01C 7/206; A01C 7/20; A01B 49/06; A01B 49/04; A01B 49/00
See application file for complete search history.

(56) References Cited

U.S. PATENT DOCUMENTS 7,617,782 B2 * 11/2009  Sheppard ............... A01C 5/062
                                                         111/135

* cited by examiner

*Primary Examiner* — Christopher J. Novosad
(74) *Attorney, Agent, or Firm* — Fitch, Even, Tabin & Flannery LLP (57) ABSTRACT

A plough assembly (10) to be drawn by a plough frame that is attached to a prime mover. The assembly (10) includes a digging shank (14) attached to a clamp (11) that is to be attached to the plough frame. Attached to the lower end of the shank (14) is a digging assembly (21). The digging assembly (21) includes a mounting (22) and a digging blade (23). Behind the digging blade (23) is a twin road seeding boot (76). Following the boot (76) is a press wheel (68), with the seeding boot (76) having a transverse width greater than the transverse width of the blade (23).

16 Claims, 9 Drawing Sheets

SEEDING TOOL

FIELD

The present invention relates to plough assemblies and more particularly to earth working and seeding tools for plough assemblies.

BACKGROUND

Traditionally seed planting occurred after the soil had been ploughed, typically inverted. Accordingly it was usual to make multiple passes over the same pieces of ground.

The above discussed method of farming resulted in destruction of the soil structure. This had a number of disadvantages including moisture loss and not optimising conditions for new growth and germination. The above issues were addressed by minimum tillage methods and machinery. An example of such machinery is described in Australian Patent 528237. The plough of Australian Patent 528237 was a deep tillage implement with a digging blade with a seeding assembly that followed.

Improvements in respect of the above discussed ploughs, are described in Australian Patents 541415, 640025, 675376 and 2007202357, as well as Australian Patent Applications 2011201476 and 2014218389.

The improved plough assemblies had a digging shank that formed a slot in the soil in the direction of travel of the plough. Following the digging shank, a closing tool engaged the soil and provided a seed bed. Following the closing tool, a seeding boot would deposit the seed on the seed bed. Most preferably, a fertiliser tube followed the digging blade so as to deposit fertiliser at a position below the seed bed.

More recently seeding assemblies have delivered seed in two rows, the rows being associated with a single digging shank that formed a central slot in the soil. The rows were displaced laterally with fertiliser deposited at the lower portion of the soil slot.

Dual row seeding equipment is described in U.S. Pat. Nos. 5,331,907, 5,396,851, 7,617,782, 7,685,951 and 6,955,131.

The general object of providing dual seed row planting was that it was more efficient to plant two rows rather than one for each part of a digging shank.

A disadvantage of known dual row planting equipment is that the soil area to which the seed is delivered is not well adapted to promote germination, promote new growth and maximise yield.

OBJECT

It is the object of the present invention to overcome or substantially ameliorate at least one of the above disadvantages.

SUMMARY OF INVENTION

There is disclosed herein a seeding boot to follow a digging shank that forms a trough in a soil layer, the trough extending in a forward direction in which the shank has been moved through the soil layer, the seeding boot including:

a pair of downwardly facing lower surfaces, the downwardly facing surfaces being transversely spaced and being rearwardly downwardly inclined so as to engage the soil to move the soil downward to form a pair of generally parallel slots providing seed beds in the soil layer behind the boot to receive and retain seed;

a seed inlet duct to which the seed is delivered; and a pair of seed outlet ducts communicating with the inlet duct to receive the seed therefrom, each outlet duct having a rearwardly facing outlet opening, each outlet opening being behind a respective one of the downwardly facing surfaces so as to deliver seed to a respective one of the grooves.

Preferably, the boot includes a pair of forwardly upper facing surfaces to engage the soil, the upper surfaces being upwardly rearwardly extending so that when the soil is engaged the soil is moved upwardly by the upper surfaces.

Preferably, the upper surfaces provided a convex configuration to cause the soil to lift as the upper surfaces are moved through the soil.

Preferably, the boot has a longitudinal length, with the lower surfaces extending a majority of the longitudinal length.

Preferably, the lower surfaces are inclined so as to be located in planes that intersect centrally below the boot so that the lower surfaces are at least partly transversely outwardly facing.

Preferably, the lower surfaces converge rearwardly.

There is further disclosed herein, in combination, the above seeding boot and the digging shank, and a digging blade attached to a lower portion of the shank so as to be moved therewith, with the boot aligned in said direction behind the shank, and wherein the boot has a transverse width greater than the transverse width of the blade.

Preferably, the blade is positioned to be located deeper in the soil layer than the boot.

Preferably, the blade and boot are aligned in said direction.

Preferably, the combination further includes a fertiliser delivery tube to deliver fertiliser behind the blade.

Preferably, the combination further includes a press wheel behind the boot, with the press wheel having a transverse width approximately the transverse width of the boot.

BRIEF DESCRIPTION OF DRAWINGS

Preferred forms of the present invention will now be described by way of example with reference to the accompanying drawings wherein.

DESCRIPTION OF EMBODIMENTS

In the accompanying drawings there is schematically depicted a plough assembly 10. The plough assembly 10 is intended to be attached to a plough frame that includes a transverse beam engaged by a clamp 11. Typically the frame would have attached to it a plurality of the assemblies 10, and would be drawn in a forward direction 12 by prime mover such as a tractor. The assembly 10 would be moved through a soil layer 27 having an upper surface 13.

Figure 1:
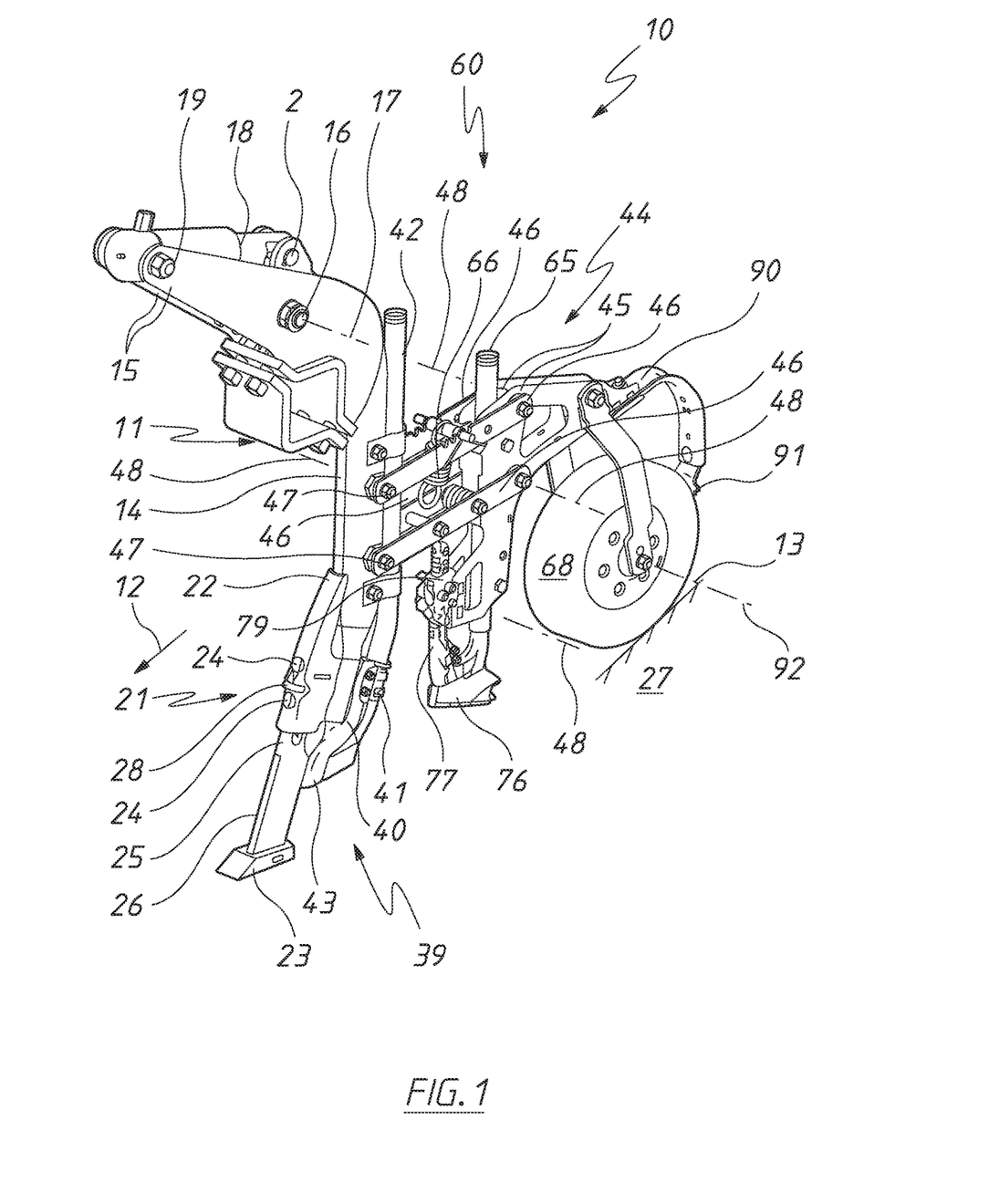
FIG. 1 is a schematic isometric view of a plough assembly.

Supported by the clamp 11 is a digging and seeding assembly 60. The assembly 60 includes a digging shank 14 pivotally attached to the clamp 11 by a pair of brackets 15 fixed to the clamp 11. The shank 14 is pivotally attached to the brackets 15 by means of a pivot pin (bolts) 16 so that the shank 14 can pivot about the generally horizontal transverse axis 17. The axis 17 is generally perpendicular to the direction 12. Extending between the shank 14 and the brackets 15 is a hydraulic ram 18 that urges the shank 14 to a predetermined digging position as shown in FIG. 1. However, when an obstacle is encountered, the shank 14 is allowed to pivot rearwardly in a direction opposite the direction 12 about the axis 17, by contraction of the ram 18. Once the obstacle has passed, the ram 18 causes the shank 14 to move to its operative predetermined digging position as shown in FIG. 1.

The ram 18 is pivotally attached to the brackets 15 by means of a pivot pin (bolt) 19, while the ram 18 is pivotally attached to the shank 14 by means of a pivot pin (bolt) 20. The pins 19 and 20 provide for pivoting movement about axes parallel to the axis 17.

Figure 2:
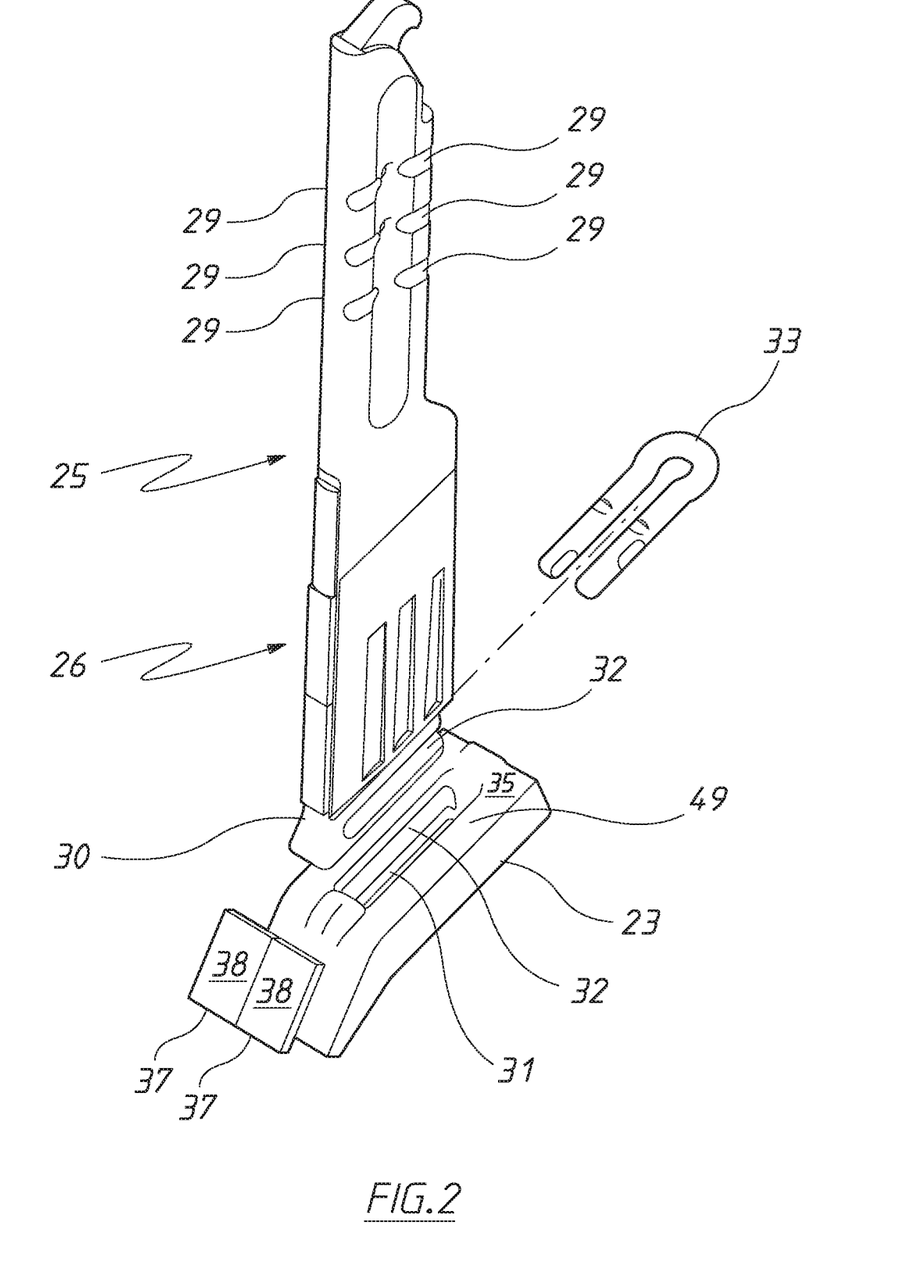
FIG. 2 is a schematic parts exploded isometric view of a digging shank and digging blade employed in the assembly of FIG. 1.
Figure 3:
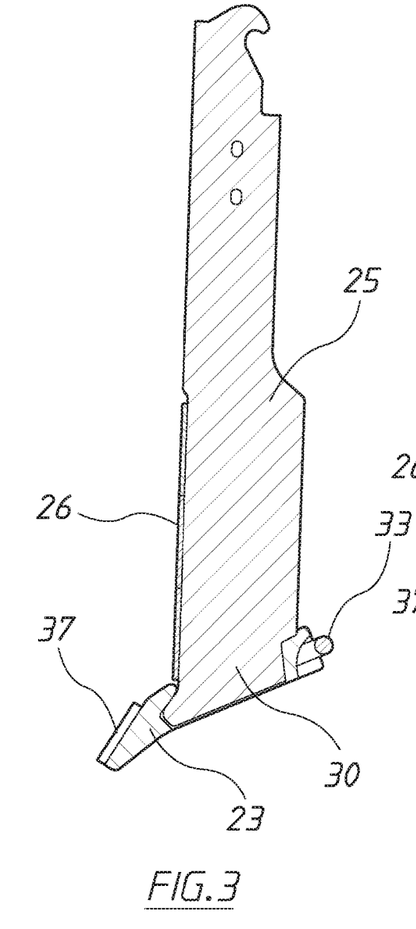
FIG. 3 is a schematic sectioned side elevation of the shank and blade of FIG. 1.
Figure 4:
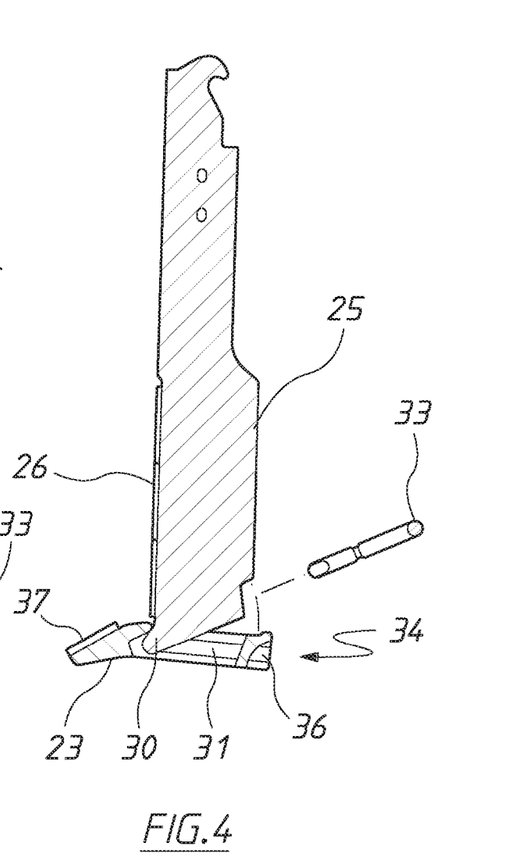
FIG. 4 is a schematic sectioned side elevation of the shank and digging blade of FIG. 1 being assembled.
Figure 5:
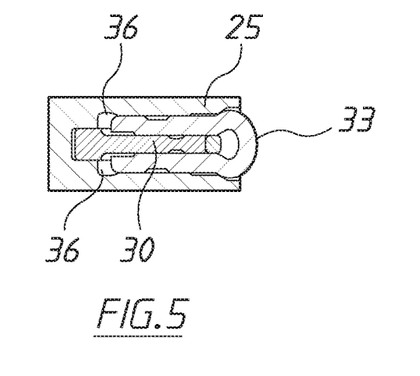
FIG. 5 is a schematic sectioned plan view of the shank and blade of FIG. 2.

Attached to a lower portion of the shank 14 is a digging assembly 21. The digging assembly 21 includes a mounting member 22 and a digging blade 23.

The mounting member 22 includes rearwardly extending passages 24 through which bolts are inserted to fix the mounting member to a lower portion of the shank 14.

The mounting member 22 includes an upwardly extending cavity within which there projects a digging blade part 25, to a lower end of which there is attached the blade 23. Typically the part 25 would include a forward facing portion 26 formed of harder material that would resist wear.

The shank 14, in its operative position as shown in FIG. 1, locates the part 25 so that it projects below the surface 13 to locate the blade 23 at a desired position in the soil layer 27.

The mounting member 22 receives a pin 28 that passes through passages in the mounting member 22 to engage in a selected pair of slots 29. In that regard it should be appreciated that pairs of slots 29 are formed in each side of the part 25, with the pin 28 engaging the selected slots 29 to adjust the height of the blade 23 relative to the shank 14, and therefore the distance below the surface 13.

The lower portion of the part 25 is provided with a projection 30 that extends into a passage 31 in the blade 23. The projection 30 has a pair of rearwardly extending slots 32 that receive a pin 33 to secure the blade 23 to the part 25. In particular, the blade 23 has a rearwardly facing aperture 34 through which the pin 33 is inserted to locate the pin 33 in the slots 32 to fix the blade 23 to the part 26. In particular, the blade 23 has slots 36 that also receive the pin 33 to fix the blade 23 to the part 26.

Figure 14:
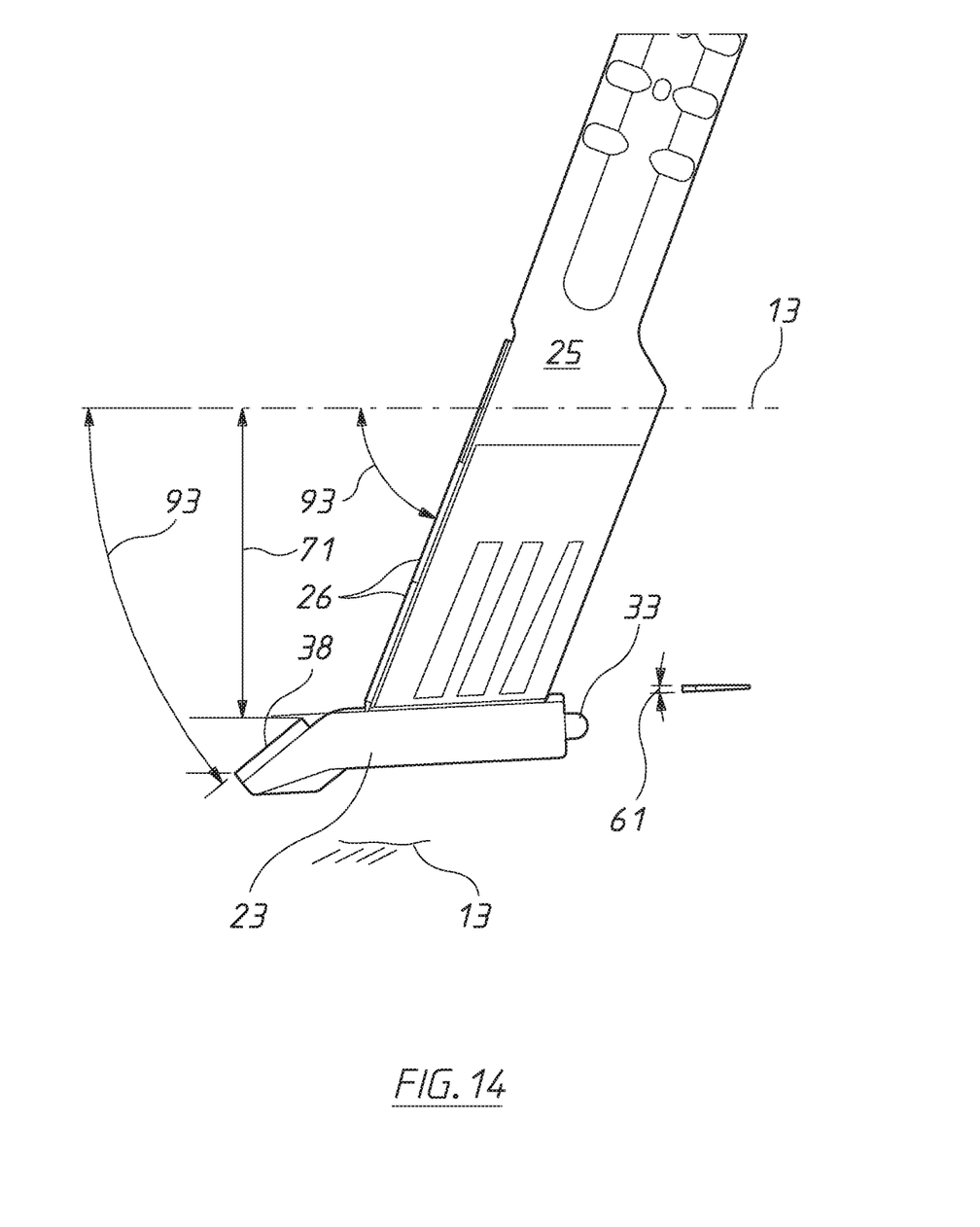
FIG. 14 is a schematic side elevation of the digging shank and blade of the assembly of FIG. 1.

The blade 23 includes a body 35 with a leading portion to which there is attached wear plates 37. The wear plates 37 are forward facing and have leading surfaces 38 inclined to the direction 12, by an acute angle 93, so as to be upwardly and forwardly facing. The blade body 35 has an upwardly facing surface 49 that slopes upwardly to the rear at an acute angle 61 (FIG. 14) the surface 49 engages the soil after it has been engaged by the surfaces 58. The angle 61 is relative to the horizontal and the soil surface 13, and is about 5°.

Also attached to the shank 14 is a fertiliser delivery assembly 39 that delivers fertiliser 75 to the trough formed by the blade 23.

The fertiliser assembly 39 includes a mounting member 40 attached to the shank 14 by threaded fasteners. The assembly 39 includes a tubular part 41 to which there is attached a tube 42 to which there is delivered fertiliser 75. The tube 42 communicates with a fertiliser boot 43 that is hollow and receives the fertiliser 75 and delivers the fertiliser 75 to the trough (FIG. 15) being formed by the blade 23.

Also attached to the shank 14 is a seeding assembly 44. The seeding assembly 44 includes parallel mounting plates 45 that are maintained in a generally upright orientation, and attached to the shank 14 by a parallelogram mechanism including four links 46. The links 46 are arranged in pairs, including an upper pair and a lower pair, with all the links 46 being maintained parallel. Each link 46 is pivotally attached to the shank 14 and the plates 45 by transverse bolts (pins) 47 so that each link 46 pivots relative to the shank 14 and plates 45 about the generally horizontal transverse axes 48. The axes 48 are generally perpendicular to the direction 12.

Due to the parallelogram arrangement of the links 46, the plates 45 are maintained in their generally upright orientation during pivoting movement of the links 46.

Attached to the plates 45 is a seeding boot 76 by means of a support member 77. The support member 77 is attached to the seeding boot 76 by transverse bolts 78. The member 77 engages a mounting 79 by a pin engaging in a selected one of the slots 50 and an associated transverse passage 51 to retain the boot 46 at a desired depth relative to the surface 13.

The mounting 79 is attached to the plates 45 by transverse bolts (not illustrated).

Figure 6:
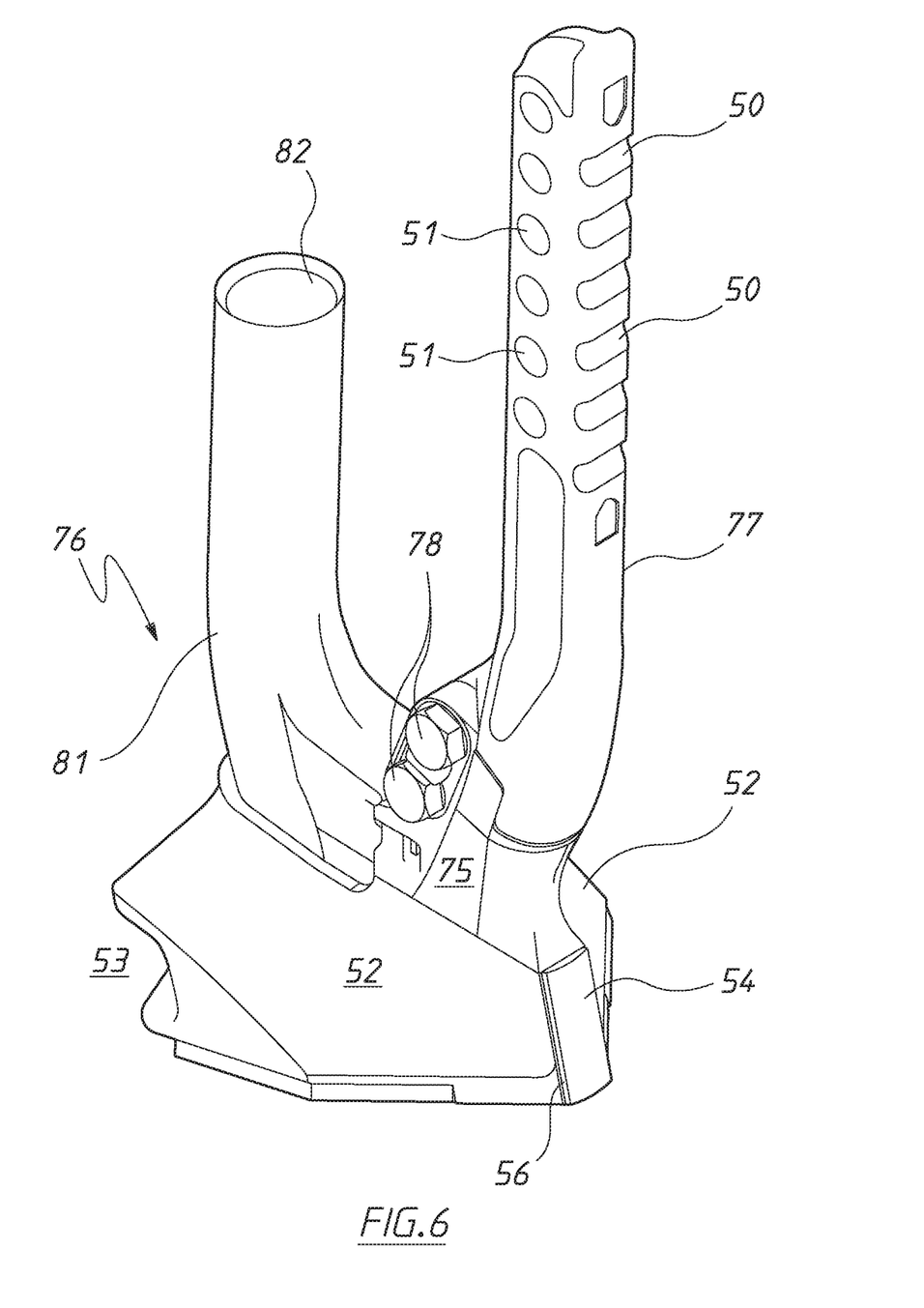
FIG. 6 is a schematic view of a seeding boot.

The boot 76 includes an upper pair of upwardly and forwardly facing surfaces 52 that converge upwardly and forwardly so as to have an upwardly convex configuration that engages soil behind the blade 23, to lift the soil to thereby provide a cavity 53 behind each surface 52, and behind the seeding boot 76.

The surfaces 52 each extend transversely downward from the central portion 95 of the boot 76, and convex upwardly so as to lift the soil, and to aid in fracturing the soil.

Figure 7:
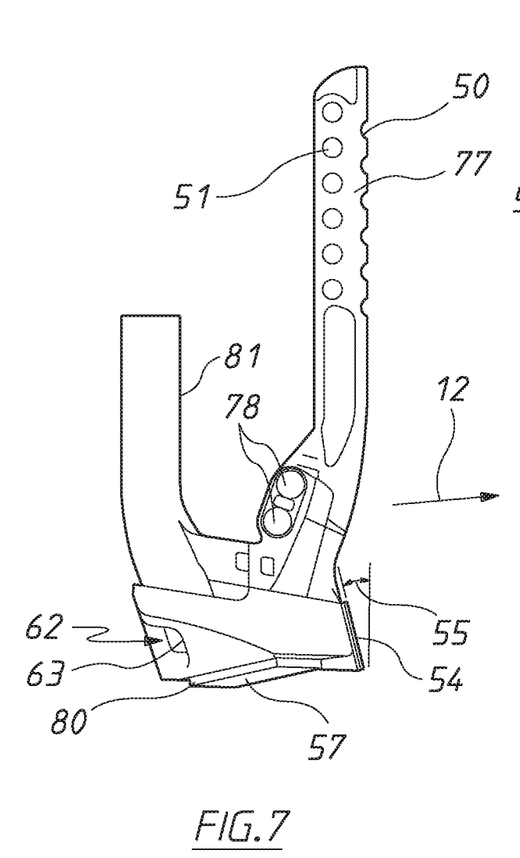
FIG. 7 is a schematic side elevation of the boot of FIG. 6.
Figure 8:
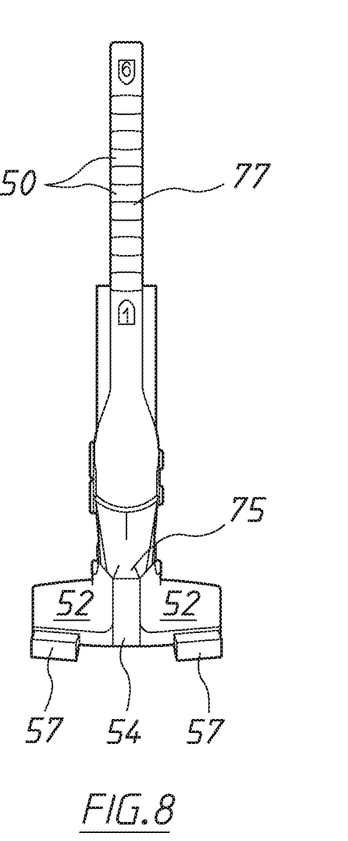
FIG. 8 is a schematic rear elevation of the boot of FIG. 6.

The seeding boot 76 also has a leading surface 54 that is upwardly and rearwardly inclined by an acute angle 55. Preferably, the surface 54 is inclined to the vertical by the acute angle 55 that is about 10° to 30°, most preferably about 20°. The surface 54 is provided by a wear resistant plate 56.

Figure 9:
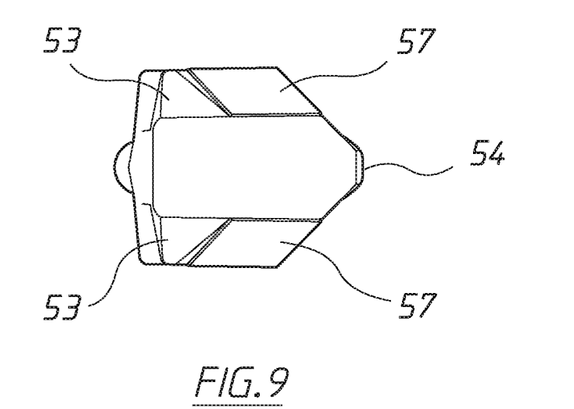
FIG. 9 is a schematic bottom plan view of the boot of FIG. 6.
Figures 10, 11, 12, 13:
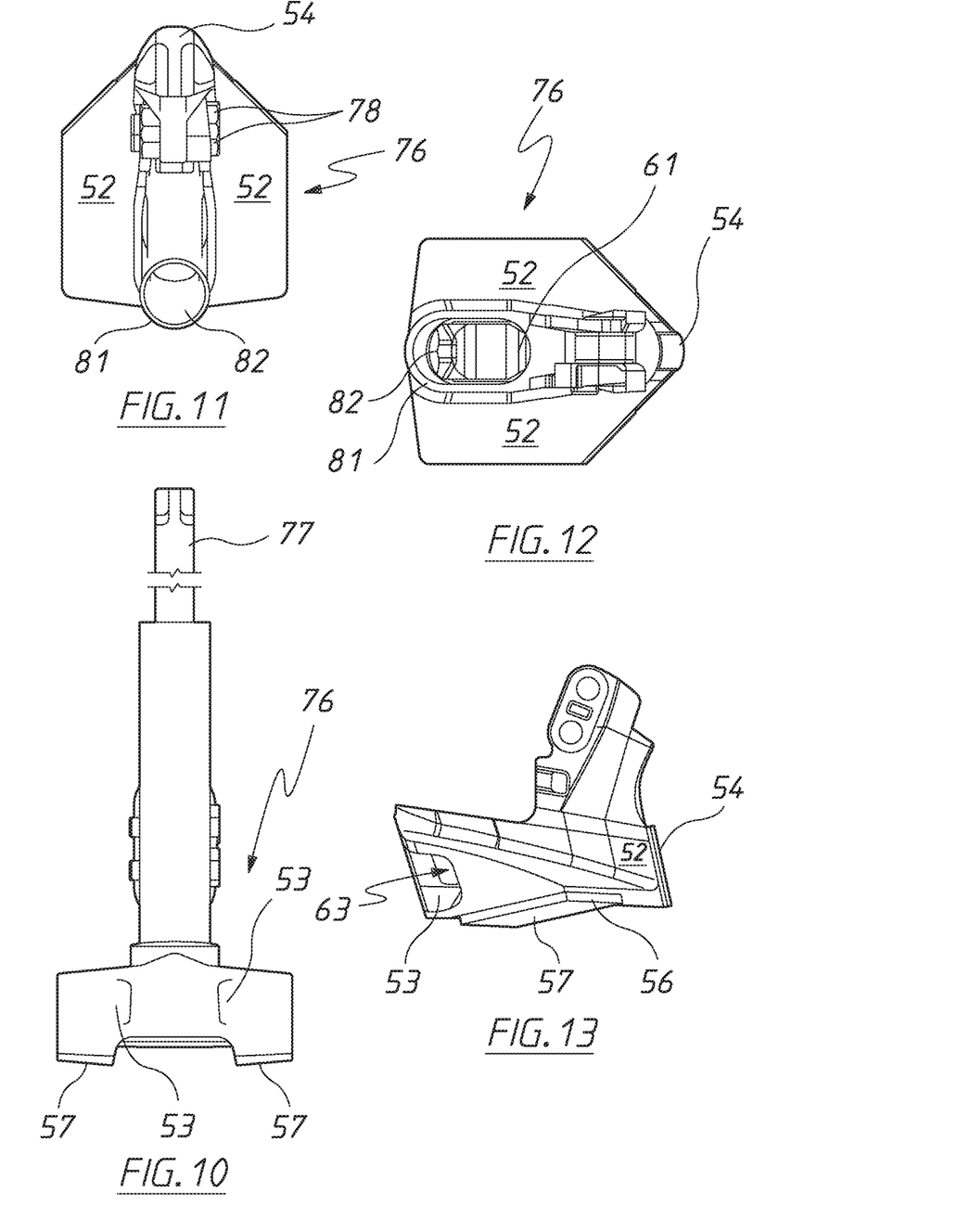
FIG. 10 is a schematic front elevation of the boot of FIG. 6.
FIG. 11 is a schematic top plan view of the boot of FIG. 6.
FIG. 12 is a schematic top plan view of portion of the boot of FIG. 6.
FIG. 13 is a schematic side elevation of the boot portion of FIG. 12.

The boot 46 also includes a pair of lower surfaces 57. The surfaces 57 are transversely spaced and face downwardly. More particularly, the surfaces 57 are rearwardly and downwardly inclined, as well as converging rearwardly, and face slightly transversely outward so as to form a pair of generally parallel slots 58 that are transversely spaced and receive seed 59. The surfaces 57 are provided by wear resistant plates 80. The surfaces 57, in creating the seed bed 64 partly compresses the soil forming the seed bed 64.

The surfaces 57 extend rearward from adjacent the leading surface 54 to adjacent the opening 63, so that the surfaces 57 extend the majority of the longitudinal length (extending in the direction 12) of the boot 76. Preferably, the surfaces 57 are planar and converge rearwardly, and are located in planes that intersect centrally below the boot 76.

The boot 76 also has a seed inlet duct 81 providing a passage 82 to which seed 59 is delivered. The duct 81 communicates with internal passages 61 of the boot 46, including outlet ducts 62 that terminate with the outlet openings 63 through which the seed 59 is delivered to the slots 58.

Extending to the duct 81 is a seed delivery tube 65, to which seed 59 is delivered for delivery to the duct 81.

A spring 66 extends between the upper links 46 and the shank 14 to urge the seeding assembly 44 downward. Tension in the spring 66 is adjustable.

Extending rearwardly from and fixed to the plates 45 is a mounting member 90 to which a press wheel 68 is attached. A scraper 91 engages the radial outer surface of the wheel 68 to remove soil therefrom. The wheel 68 is rotatable about a transverse horizontal axis 92 that is parallel to the axes 48.

The wheel 68 engages the soil surface 13 to maintain the boot 76 at a desired depth 71.

The portion 26 has a leading surface inclined to the horizontal (surface 13) by an acute angle 93. Preferably the angle 93 is 60° to 80° most preferably about 70°.

The surfaces 38 are inclined to the horizontal (surface 13) by an acute angle 93. Preferably the angle 93 is about 30° to 50°, most preferably about 40°.

Figure 15:
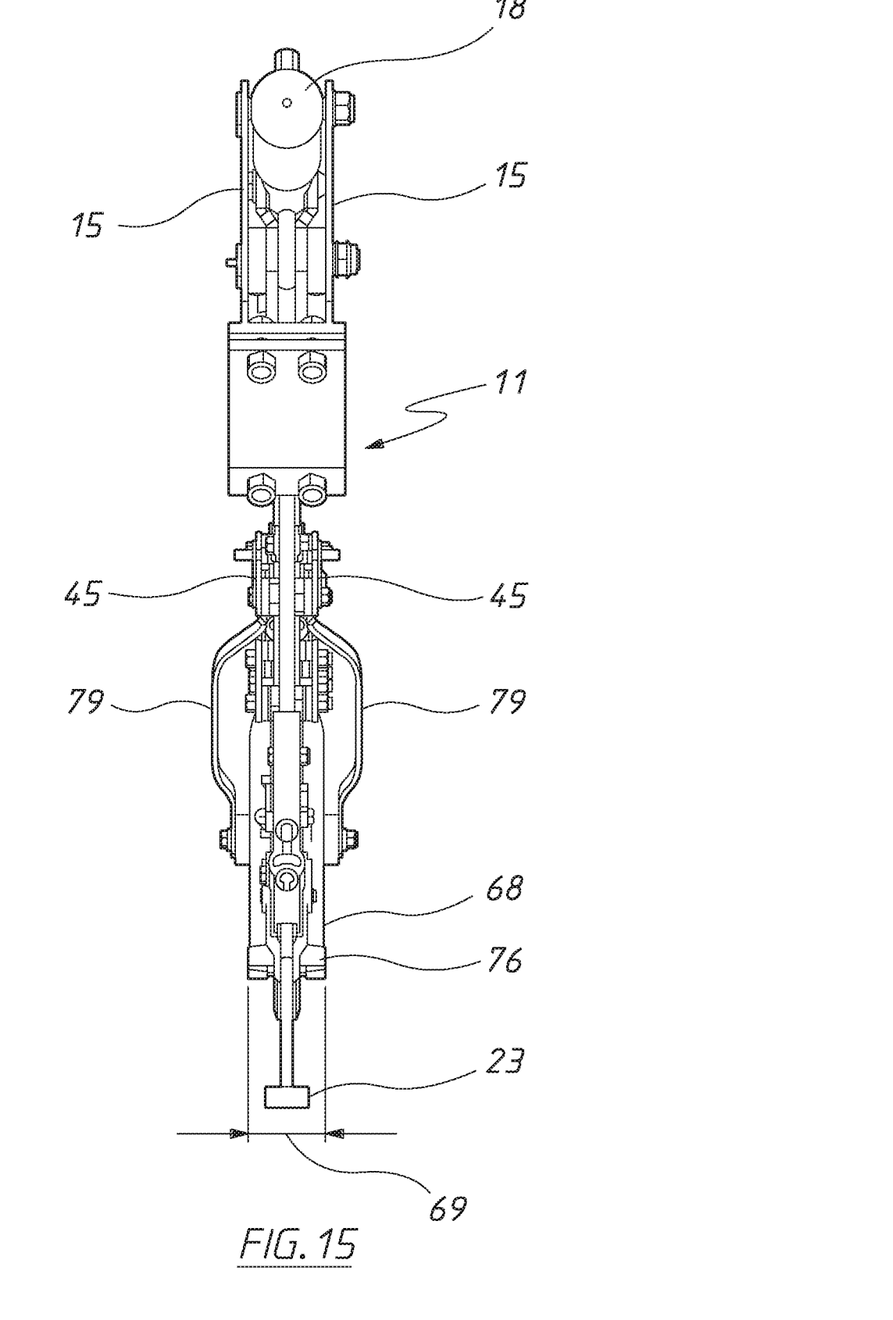
FIG. 15 is a schematic front end elevation of the assembly of FIG. 1.

As best seen in FIG. 15, the press wheel 68 has a transverse width 69 (FIG. 16) that is approximately the transverse width of the seeding boot 76. The press wheel 68 and seeding boot 76 have a transverse width greater than the transverse width of the blade 23.

As best seen in FIG. 15, the plates 45 support a pair of downwardly extending brackets 79 that are bowed transversely outward to provide better clearance for the press wheel 68, particularly if soil and other material adheres to the side surfaces of the press wheel 68.

Preferably, the scraper 91 is pointed so as to have an apex directed at material adhering to the press wheel 68. The scraper 61 points in the opposite direction to the rotational direction of the press wheel 68, parting material which may adhere to the outer peripheral surface of the press wheel 68 to aid in removal of the material.

The surface 49 of the blade 23, with the surfaces 38, lifts the soil upwards, causing a soil breakout in a V form, causing water to be collected allowing steady infiltration downwards into the deeper root zone. The loosen soil below the seed 59 facilitates underseed cultivation allowing the roots to penetrate deeply in search of water and nutrients. With a softer soil near the surface 13 the press wheel 68 forms a shallow furrow 70, further assisting with water harvesting. The rolling action of the press wheel 68 causes a wave of soil to move ahead and cover the seed 59, with pressure ensuring the fine soil particles are put in contact with the seed 59 helping germination. Both the surface furrow 70 and trough 94 reduce water runoff. Water is collected for better infiltration downwards and sideways, minimising soil erosion. Soil flows over the seed boot 76 to fall onto the surfaces of the seed bed 64 to reduce surface drying that may interfere with seed 59 emergence. The soil also forms an insulating barrier. The lifting action of the blade 23 stops the slotting effect of wet clay soils causing the seed boot 76 to form a firm seed bed 64 for accurate seed placement. The surfaces 57 forming the slots 58 converge towards the rear of the boot 76 to form a firm and accurate seed bed 64.

Figure 16:
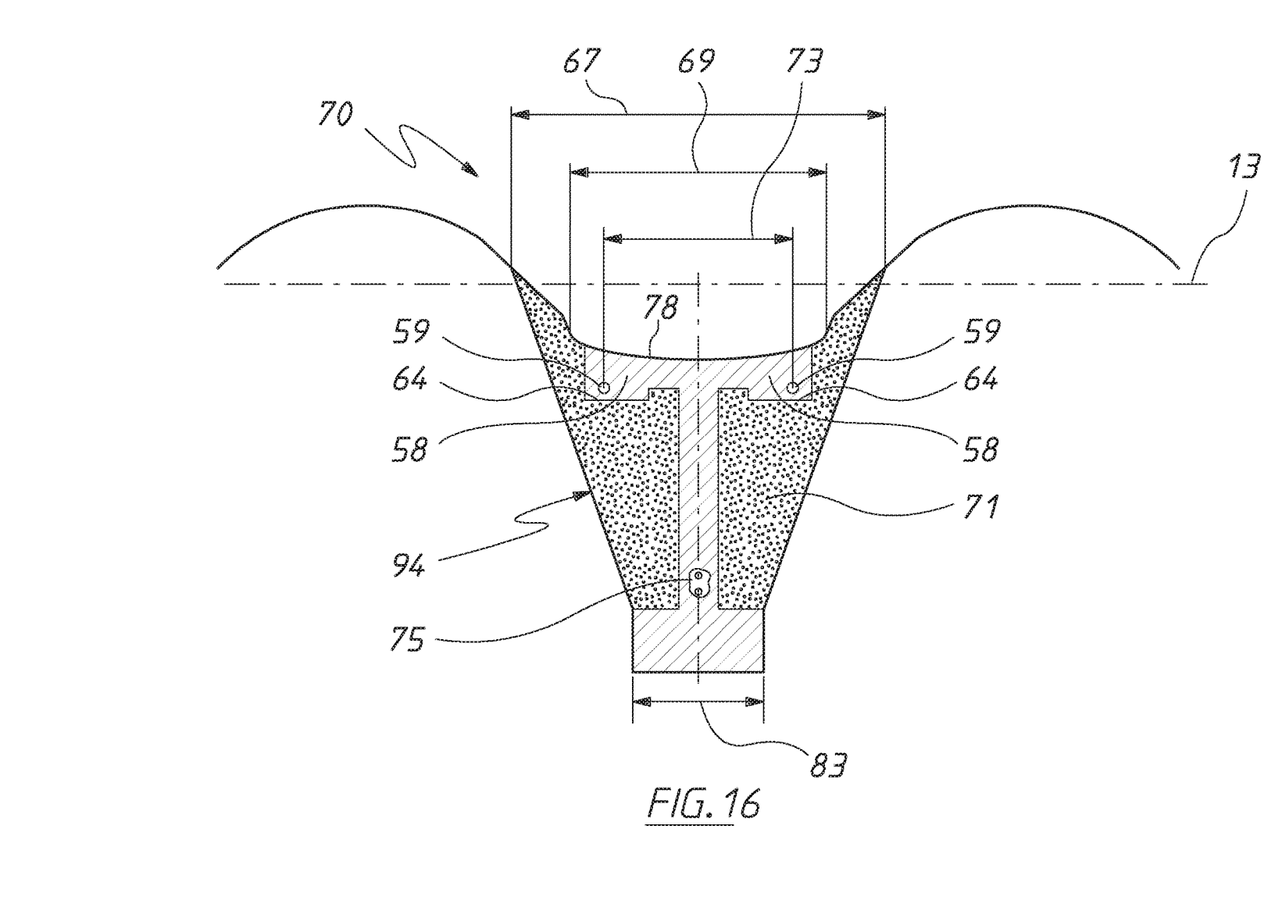
FIG. 16 is a schematic end elevation of a soil trough formed by the assembly of FIG. 1.

As best seen in FIG. 16, the blade 23 forms the trough 94 (V shaped configuration), that at its lower end has a transverse width 83 approximately the width of the blade 23. Disturbed soil 71 occupies the trough 94, with the press wheel 68 engaging the loosen soil to form the furrow 70 in the surface 13 to aid in draining water towards the trough 94. The press wheel 68 in particular fauns a concave surface 78 that further aids in collecting and directing water to the trough 94.

The furrow 70 and surface 78 have transverse widths 67 and 69 respectively (see FIG. 16) that are wider than the width 83. As the boot 76 transverse width is greater than the blade 23 transverse width, the boot 76 lifts material across a greater width than the blade 23.

In operation of the above described assembly 10, the blade 23 is located at a desired depth below the surface 13, and is moved in the forward direction 12 to form a trough 94, of disturbed soil, at a desired depth. Fertiliser 75 is delivered to a lower portion of the trough 94 through the fertiliser boot 43. Passing through the soil in the trough 94 is the boot 76. The surfaces 57 of the boot 76, by extending rearwardly, downwardly and over a substantial length of the boot 46, form a seed bed including the slot 58 at an accurate depth below the surface 13 due to the press wheel 68 maintaining the boot 76 at a desired depth. The slots 58 are located relative to the fertiliser 75 so that the seed 58 can make best use of the fertiliser without suffering from fertiliser toxicity.

The above described preferred embodiment has a number of advantages that include providing an accurately located seed bed that assists germination and new growth, while providing a soil structure with improved water retention and placement of the fertiliser.

What is claimed is:

1. A seeding boot to follow a digging shank that forms a trough in a soil layer, the trough extending in a forward direction in which the digging shank has been moved through the soil layer, the seeding boot including:
   a pair of downwardly facing lower surfaces, the pair of downwardly facing lower surfaces being transversely spaced and being rearwardly downwardly inclined so as to engage the soil layer to move soil of soil layer downward to form a pair of generally parallel slots providing seed beds in the soil layer behind the seeding boot to receive and retain seed;
   a seed inlet duct to which the seed is delivered;
   a pair of seed outlet ducts communicating with the seed inlet duct to receive the seed therefrom, each seed outlet duct having a rearwardly facing outlet opening, each rearwardly facing outlet opening being behind a respective one of the pair of downwardly facing lower surfaces so as to deliver seed to a respective one of the slots; and
   a pair of forwardly facing upper surfaces to engage the soil, the forwardly facing upper surfaces being upwardly rearwardly extending so that when the soil is engaged the soil is moved upwardly by the forwardly facing upper surfaces.

2. The seeding boot of claim 1, wherein the forwardly facing upper surfaces provided a convex configuration to cause the soil to lift as the forwardly facing upper surfaces are moved through the soil.

3. The seeding boot of claim 1, wherein the seeding boot has a longitudinal length, with the downwardly facing lower surfaces extending a majority of the longitudinal length.

4. The seeding boot of claim 3, wherein the downwardly facing lower surfaces are inclined so as to be located in planes that intersect centrally below the seeding boot so that the downwardly facing lower surfaces are at least partly transversely outwardly facing.

5. The seeding boot of claim 4, wherein the downwardly facing lower surfaces converge rearwardly.

6. The seeding boot of claim 1, wherein the downwardly facing lower surfaces are inclined so as to be located in planes that intersect centrally below the seeding boot so that the downward lower surfaces are at least partly transversely outwardly facing.

7. The seeding boot of 1, wherein the downwardly facing lower surfaces converge rearwardly.

8. In combination, the seeding boot of claim 1, and the digging shank, and a digging blade attached to a lower portion of the digging shank so as to be moved therewith, with the seeding boot aligned in said direction behind the digging shank, and wherein the seeding boot has a transverse width greater than the transverse width of the digging blade.

9. The combination of claim 8, wherein the digging blade is positioned to be located deeper in the soil layer than the seeding boot.

10. The combination of claim 8, wherein the digging blade and seeding boot are aligned in said direction.

11. The combination of claim 8, further including a fertilizer delivery tube to deliver fertilizer behind the digging blade.

12. The combination of claim 8, further including a press wheel behind the seeding boot, with the press wheel having a transverse width approximately the transverse width of the seeding boot.

13. In combination, the seeding boot of claim 1, and the digging shank, and a digging blade attached to a lower portion of the digging shank so as to be moved therewith, with the seeding boot aligned in said direction behind the digging shank, and wherein the seeding boot has a transverse width greater than the transverse width of the digging blade.

14. The combination of claim 13, wherein the digging blade is positioned to be located deeper in the soil layer than the seeding boot.

15. The combination of claim 14, wherein the digging blade and seeding boot are aligned in said direction.

16. The combination of claim 15, further including a fertiliser delivery tube to deliver fertiliser behind the digging blade, and a press wheel behind the seeding boot, with the press wheel having a transverse width approximately the transverse width of the seeding boot.

* * * * *